United States Patent
Hsu et al.

(10) Patent No.: US 10,444,329 B2
(45) Date of Patent: Oct. 15, 2019

(54) SENSING MODULE FOR ELIMINATING CROSSTALK

(71) Applicant: SensorTek technology Corp., Hsinchu County (TW)

(72) Inventors: Jer-Hau Hsu, Hsinchu County (TW); Feng-Jung Hsu, Hsinchu County (TW)

(73) Assignee: SensorTek technology Corp., Hsinchu County (TW)

( * ) Notice: Subject to any disclaimer, the term of this patent is extended or adjusted under 35 U.S.C. 154(b) by 159 days.

(21) Appl. No.: 15/871,015

(22) Filed: Jan. 14, 2018

(65) Prior Publication Data

US 2018/0203101 A1 Jul. 19, 2018

Related U.S. Application Data

(60) Provisional application No. 62/446,819, filed on Jan. 16, 2017.

(51) Int. Cl.
| | |
|---|---|
| *G01S 7/48* | (2006.01) |
| *G01S 7/481* | (2006.01) |
| *G01S 17/32* | (2006.01) |
| *G01S 17/02* | (2006.01) |
| *G01S 7/493* | (2006.01) |

(52) U.S. Cl.
CPC .......... *G01S 7/4808* (2013.01); *G01S 7/4813* (2013.01); *G01S 7/493* (2013.01); *G01S 17/026* (2013.01); *G01S 17/32* (2013.01)

(58) Field of Classification Search
CPC ...... G01S 7/4808; G01S 17/026; G01S 7/493; G01S 17/32; G01S 7/4813
See application file for complete search history.

(56) References Cited

U.S. PATENT DOCUMENTS

| | | | |
|---|---|---|---|
| 9,608,132 B2 * | 3/2017 | Kriebernegg | ............ G01V 8/10 |
| 9,641,244 B2 * | 5/2017 | Schweninger | ........ G01S 7/4811 |
| 2011/0121182 A1 | 5/2011 | Wong | |
| 2011/0186736 A1 | 8/2011 | Yao | |
| 2013/0099101 A1 | 4/2013 | Campbell | |
| 2016/0356642 A1 | 12/2016 | Uedaira | |

FOREIGN PATENT DOCUMENTS

| | | |
|---|---|---|
| CN | 104303011 A | 1/2015 |
| CN | 105223579 | 1/2016 |
| TW | 201418745 A | 5/2014 |
| TW | 201539012 A | 10/2015 |

* cited by examiner

*Primary Examiner* — Tony Ko
(74) *Attorney, Agent, or Firm* — Winston Hsu

(57) ABSTRACT

A sensing module includes a first sensor, for sensing a light signal to generate a first sensing signal including a first crosstalk component related to a crosstalk signal in the light signal; a second sensor, for sensing the light signal to generate a second sensing signal including a second crosstalk component related to the crosstalk signal; and an arithmetic unit, for combining the first sensing signal and the second sensing signal according to a ratio between the first crosstalk component and the second crosstalk component, to generate an output signal; wherein a distance between the first sensor and a light source generating the light signal is different from a distance between the second sensor and the light source.

8 Claims, 6 Drawing Sheets

SENSING MODULE FOR ELIMINATING CROSSTALK

CROSS REFERENCE TO RELATED APPLICATIONS

This application claims the benefit of U.S. Provisional Application No. 62/446,819, filed on Jan. 16, 2017 and entitled "SYSTEM AND METHOD FOR REDUCING CROSSTALK", the contents of which are incorporated herein in their entirety.

BACKGROUND OF THE INVENTION

1. Field of the Invention

The present invention relates to a sensing module, and more particularly, to a sensing module capable of eliminating crosstalk.

2. Description of the Prior Art

An electronic device includes a variety of sensors to sense the environment or user behaviors, so as to adjust operations. For example, a smartphone is usually equipped with a proximity sensor for sensing whether a user approaches, to accordingly turn the display on or off, adjust the volume of the speaker, etc. In general, in order to sense the environment or user behaviors, the sensor emits light and senses light reflected by a testing object, so as to measure the distance, transparency, color, or other physical characteristics of the testing object. However, during the process, the sensor inevitably receives light not reflected by the testing object, and thus, crosstalk occurs and affects measurement results of the sensor.

To improve crosstalk, the prior art has provided a plurality of techniques for eliminating crosstalk. For example, China patent No. 105223579A, US patents No. 20110121182, No. 20110121182, No. 20160356642A1, etc. have disclosed different techniques to reduce crosstalk. However, the prior art crosstalk reducing methods usually determine the degree of crosstalk by analyzing light reflected by objects, and perform corresponding compensation, which have low accuracy, high calibration costs, and are not suitable for practical applications.

In addition, to reach artistic design, the manufacturers of new generation electronic products gradually refuse to drill a hole on a case (e.g. made of glass) above a sensor (e.g. proximity sensor) of an electronic product. In such a situation, if the sensor measures light to perform sensing, the case without a hole would significantly reflect light emitted by the sensor. As a result, light sensed by the sensor would include reflected light from the case, which affects the accuracy of the sensing result generated by the sensor. In other words, the crosstalk effect is severe, and the traditional techniques of reducing crosstalk do not aim at non-hole applications. Therefore, how to enhance the accuracy of the sensors in response to the artistic design of the new generation electronic product has been an issue in the industry.

SUMMARY OF THE INVENTION

To solve the problems above, the present invention provides a sensing module capable of eliminating crosstalk.

In an aspect, the present invention discloses a sensing module, comprising a first sensor, for sensing a light signal to generate a first sensing signal comprising a first crosstalk component related to a crosstalk signal in the light signal; a second sensor, for sensing the light signal to generate a second sensing signal comprising a second crosstalk component related to the crosstalk signal; and an arithmetic unit, for combining the first sensing signal and the second sensing signal according to a ratio between the first crosstalk component and the second crosstalk component, to generate an output signal; wherein a distance between the first sensor and a light source generating the light signal is different from a distance between the second sensor and the light source.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
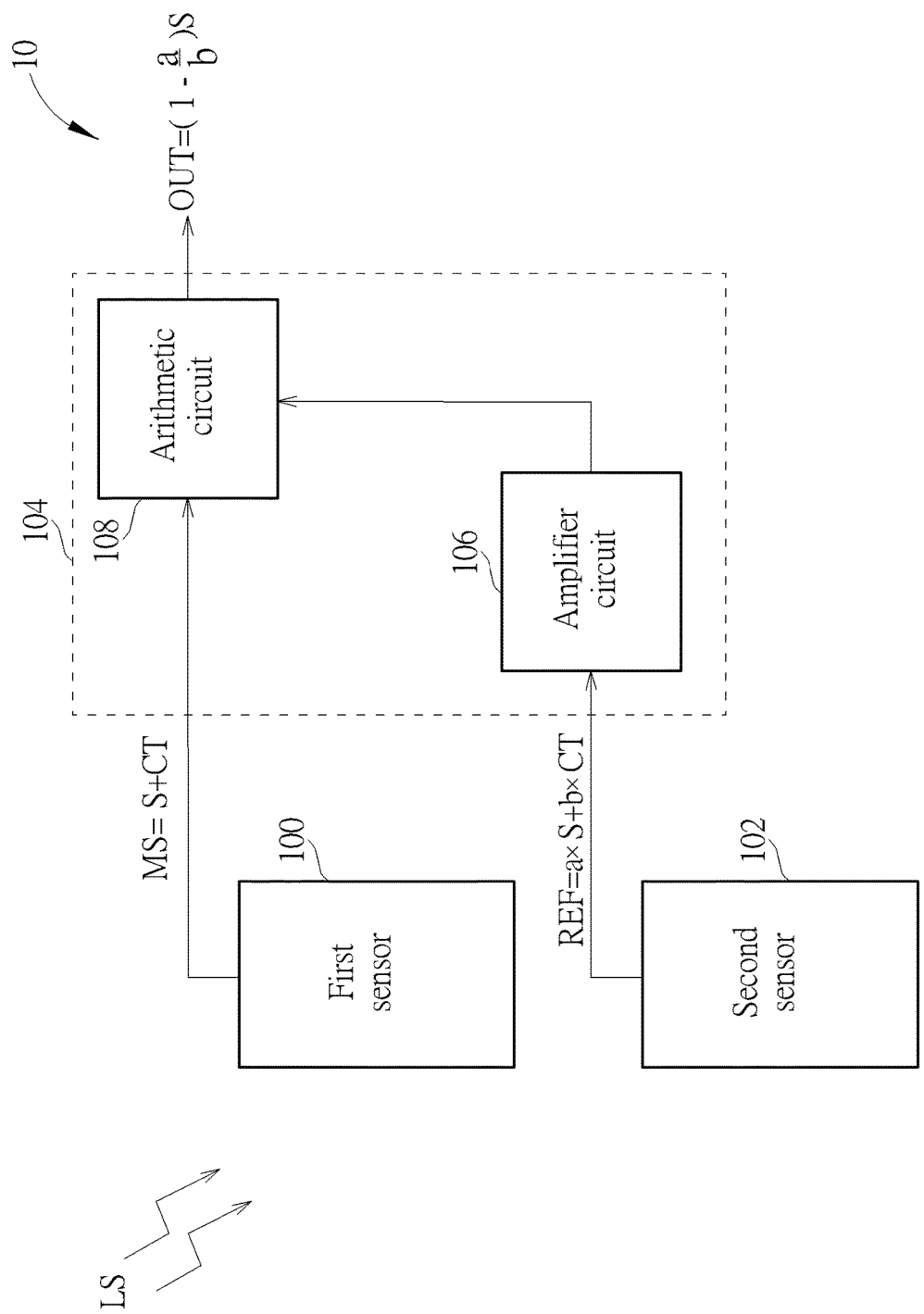
FIG. 1 is a schematic diagram of a sensing module according to an embodiment of the present invention.

FIG. 1 is a schematic diagram of a sensing module 10 according to an embodiment of the present invention. The sensing module 10 may be a proximity sensor utilized in an electronic device (e.g., smartphone, tablet, notebook computer, etc.) for sensing whether an outer object approaches, and is not limited thereto. As shown in FIG. 1, the sensing module 10 includes a first sensor 100, a second sensor 102 and an arithmetic unit 104. The first sensor 100 may be a photodiode, for sensing a light signal LS which is within a specified frequency range and generated by a light source (not shown in FIG. 1), and generating a first sensing signal MS. The composition of the first sensing signal MS may be represented as:

$$MS = S + CT$$

where S denotes a reflection component related to the light signal LS reflected by an outer object in the first sensing signal MS, and CT denotes a crosstalk component related to the light signal LS not reflected by the outer object (e.g. reflected by a case of the electronic device) in the first sensing signal MS. Similarly, the second sensor 102 is also utilized for sensing the light signal LS, to generate a second sensing signal REF. The second sensing signal REF may be represented as:

$$REF = a \times S + b \times CT$$

where a×S denotes a reflection component related to the light signal LS reflected by the outer object in the second sensing signal REF, b×CT denotes a crosstalk component related to the light signal LS not reflected the outer object in the second sensing signal REF, and a, b are constants not equal to 0. The arithmetic unit 104 is utilized for combining the first sensing signal MS and the second sensing signal REF to generate an output signal OUT not including the crosstalk component according to a ratio $$\left(\text{i.e., } 1{:}b, \text{ equal to } \frac{1}{b}\right)$$

between the crosstalk components CT and b×CT of the first sensing signal MS and the second sensing signal REF. For example, the arithmetic unit 104 may utilize an amplifier circuit 106 to multiply the second sensing signal REF by a negative of the ratio $$\left(\text{i.e., } \frac{-1}{b}\right),$$

and utilize an arithmetic circuit 108 to add the first sensing signal MS and the multiplied second sensing signal REF together, to generate the output signal OUT $$\left(\text{i.e., } OUT = MS - \frac{1}{b} \times REF\right).$$

In such a situation, the output signal OUT may be represented as:

$$OUT = \left(1 - \frac{a}{b}\right)S$$

As can be known from the above equation, as long as the constant "a" is not equal to the constant "b", meaning that the ratio between the reflection component of the first sensing signal MS and the reflection component of the second sensing signal REF is different from the ratio between the crosstalk component of the first sensing signal MS and the crosstalk component of the second sensing signal REF, the output signal OUT would include only the reflection component related to the light signal LS reflected by the outer object, such that the sensing module 10 may accurately determine whether the outer object approaches the electronic device according to the output signal OUT.

Figure 2:
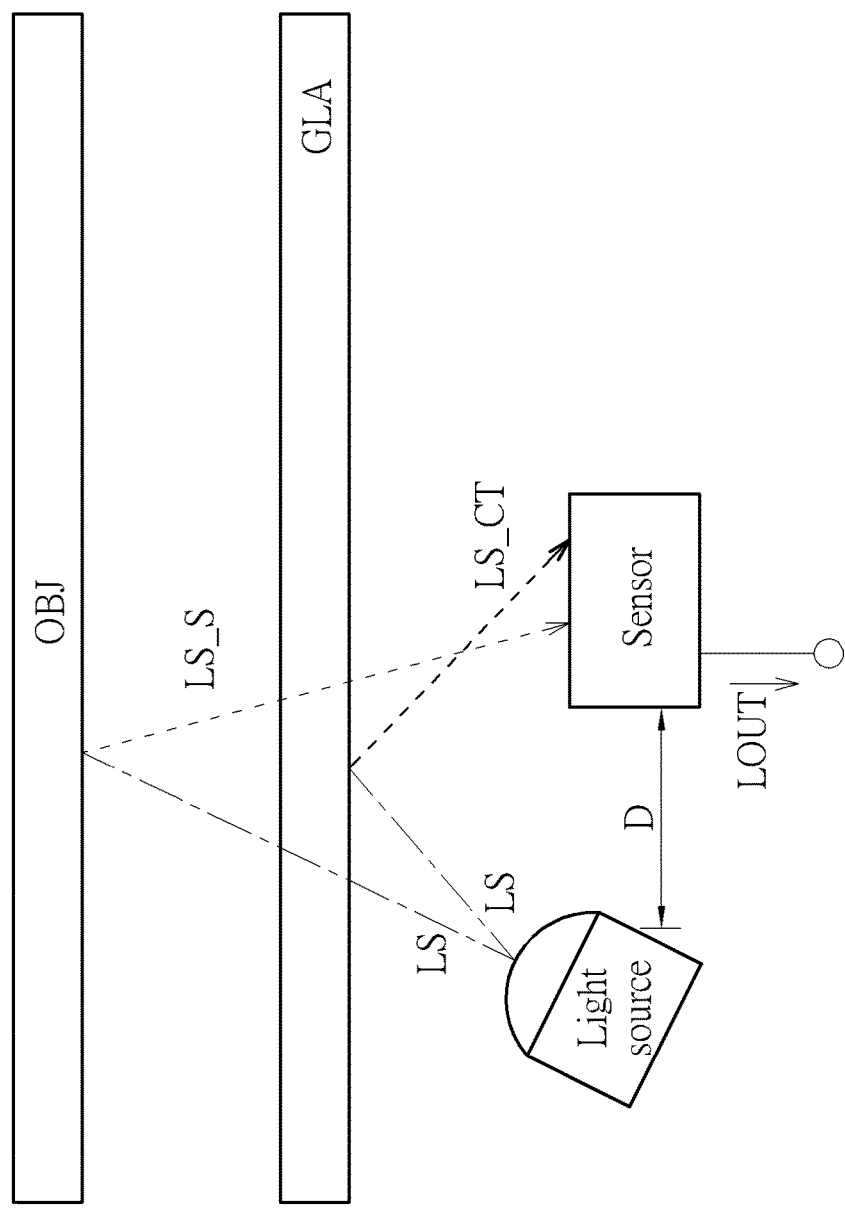
FIG. 2 is a schematic diagram of a sensor receiving a light signal according to an embodiment of the present invention.

In detail, please refer to FIG. 2, which is a schematic diagram of the sensor receiving the light signal LS according to an embodiment of the present invention. FIG. 2 illustrates an outer object OBJ, a case (e.g. made of glass) of an electronic device, a light source and a sensor, wherein D denotes a distance between the sensor and the light source. The sensor shown in FIG. 2 may be the first sensor 100 or the second sensor 102 shown in FIG. 1. As shown in FIG. 2, the light source emits the light signal LS which is within a specified frequency range, to sense whether the outer object OBJ approaches the electronic device. The sensor receives the light signal LS reflected by the outer object OBJ (denoted by light LS_S) as well as the light signal LS not reflected by the outer object OBJ (e.g. reflected by the case GLA, and denoted by light LS_CT), to generate an output signal LOUT. Since the sensor is utilized for sensing the outer object OBJ, the light signal LS not reflected by the outer object OBJ (i.e., the light LS_CT) equals a crosstalk signal, such that the component related to the light LS_CT in the output signal LOUT would be taken as a crosstalk component CT, and the component related to the light LS_S in the output signal LOUT would be taken as a reflection component S. Note that, for illustration purpose, FIG. 2 does not illustrate variation of the light signal LS passing through the case GLA (e.g. refraction and scattering).

Figure 3:
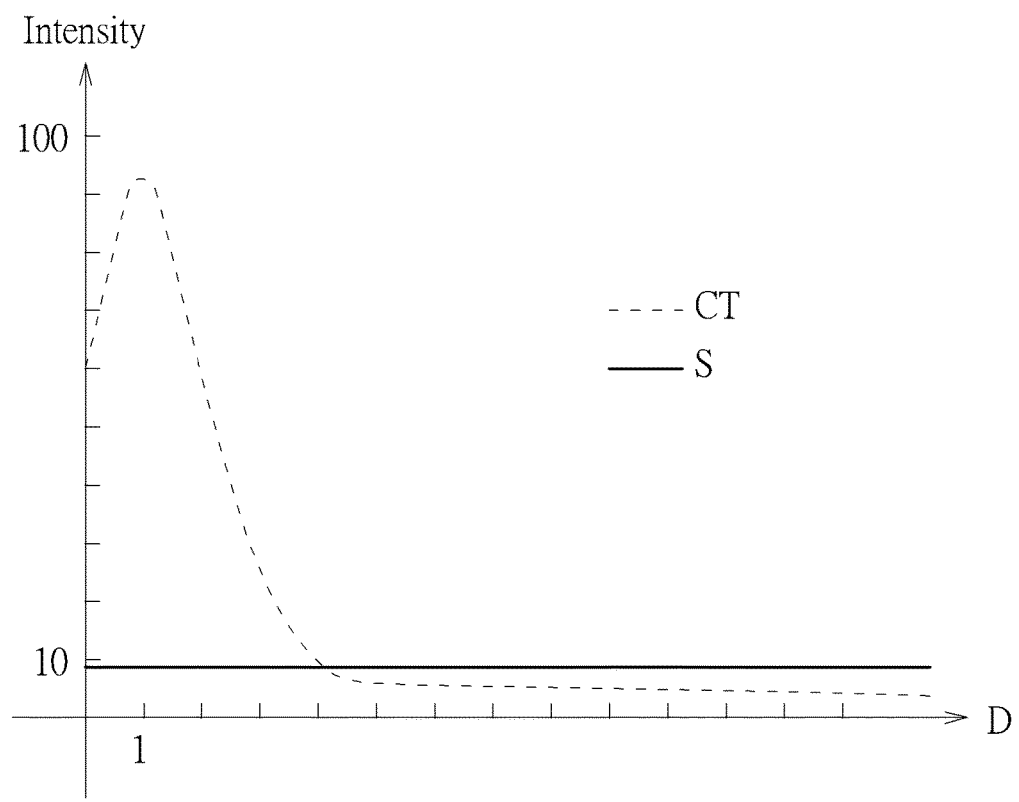
FIG. 3 is a schematic diagram of a relation between a distance from the sensor to a light source shown in FIG. 2 and light intensities of an output signal.

Please refer to FIG. 3, which is a schematic diagram of a relation between the distance D from the sensor to the light source shown in FIG. 2 and intensities of the reflection component S and the crosstalk component CT in the output signal LOUT. As shown in FIG. 3, the intensity of the reflection component S related to the light LS_S in the output signal LOUT does not obviously vary as the distance D changes. In comparison, when the distance D changes, the intensity of the crosstalk component CT related to the light LS_CT in the output signal LOUT obviously varies.

As can be seen from FIG. 3, when the light sensitivities of the first sensor 100 and the second sensor 102 are the same, e.g. the areas thereof are the same, if the distance between the light source and the first sensor 100 is different from the distance between the light source and the second sensor 102, the first sensing signal MS and the second sensing signal REF would have different intensities in the reflection components S, a×S and in the crosstalk components CT, b×CT. Since the intensity variations of the crosstalk components CT, b×CT as the distance D changes are more obvious than the intensity variations of the reflection components S, a×S as the distance D changes, the constant "a" does not equal the constant "b". In such a situation, the arithmetic unit 104 may suitably combine the first sensing signal MS and the second sensing signal REF, to keep the reflection component when eliminating the crosstalk component of the output signal OUT.

Figure 4:
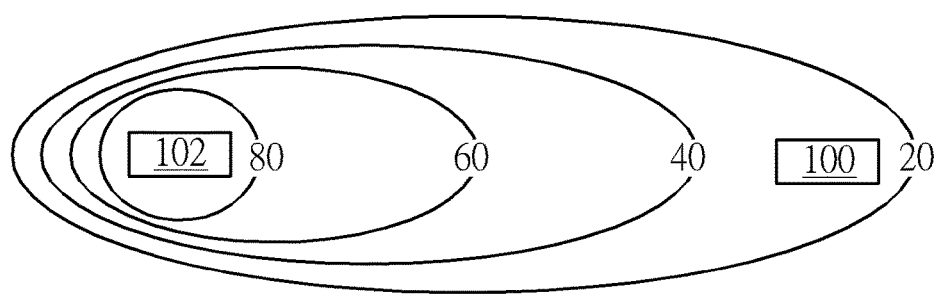
FIG. 4 is a schematic diagram of a configuration of a first sensor and a second sensor according to an embodiment of the present invention.

Please refer to FIG. 4, which is a schematic diagram of a configuration of the first sensor 100 and the second sensor 102 according to an embodiment of the present invention. FIG. 4 illustrates intensity curves of the light signal LS not reflected by the outer object OBJ. For example, the first sensor 100 is disposed near an intensity curve 20, representing that the intensity of the light signal LS not reflected by the outer object OBJ and received by each unit area of the first sensor 100 is approximate to 20; and the second sensor 102 is disposed near an intensity curve 80, representing that the intensity of the light signal LS not reflected by the outer object OBJ and received by each unit area of the second sensor 102 is approximate to 80. In other words, the crosstalk component sensed by each unit area of the second sensor 102 is approximate to 4 times the crosstalk component sensed by each unit area of the first sensor 100.

In an embodiment, the first sensor 100 and the second sensor 102 shown in FIG. 4 have an identical light sensitivity (e.g. have the same area). According to FIG. 3 and FIG. 4, the first sensing signal MS and the second sensing signal REF may be represented as:

$$MS = S + CT$$

$$REF = a \times S + 4 \times CT$$

In such a situation, the arithmetic unit 104 may subtract $$\frac{1}{4}$$

of the second sensing signal REF from the first sensing signal MS, to obtain the output signal OUT, so as to eliminate the crosstalk component in the output signal OUT.

In another embodiment, the sensitivity of the first sensor 100 shown in FIG. 4 may be set as 4 times the sensitivity of the second sensor 102 (e.g. to set the area of the first sensor 100 as 4 times the area of the second sensor 102). According to FIG. 3 and FIG. 4, the first sensing signal MS and the second sensing signal REF may be represented as:

$$MS=4\times S+4\times CT$$

$$REF=a\times S+4\times CT$$

In this embodiment, the first sensing signal MS and the second sensing signal REF have the crosstalk components CT with the same intensity. Therefore, the arithmetic unit 104 may directly subtract the second sensing signal REF from the first sensing signal MS to obtain the output signal OUT, so as to eliminate the crosstalk component in the output signal OUT. In other words, the embodiment of the present invention may adjust the light sensitivities of the first sensor 100 and the second sensor 102, to make the first sensing signal MS and the second sensing signal REF to have the crosstalk components CT with the same intensity and the light components $4\times S$, $a\times S$ with different intensities, so as to apply subtractions to eliminate the crosstalk component in the output signal OUT.

Figure 5:
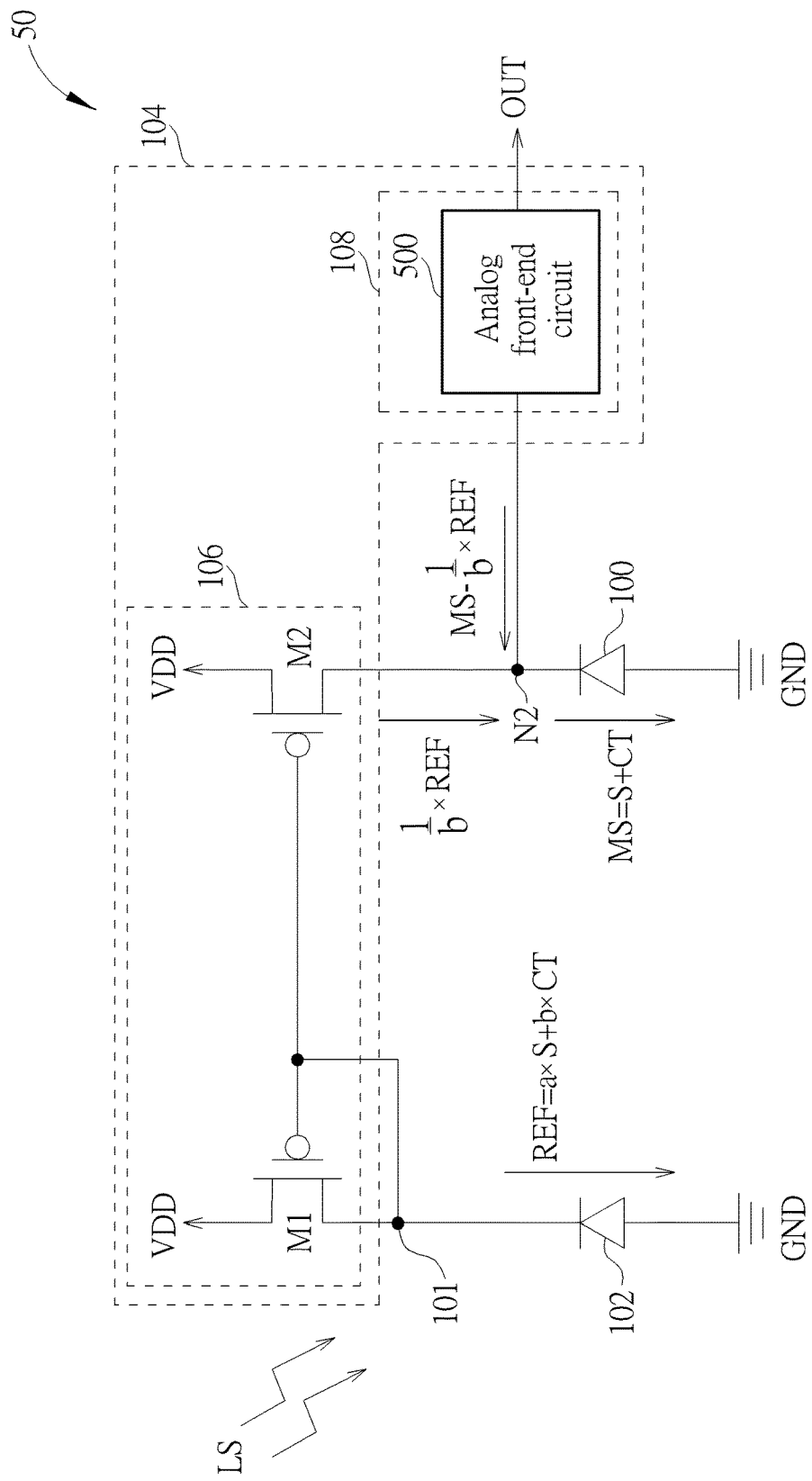
FIG. 5 is a schematic diagram of a sensing module according to an embodiment of the present invention.

According to different applications or design requirements, the sensing module 10 may be achieved by different ways. Please refer to FIG. 5, which is a schematic diagram of a sensing module 50 according to an embodiment of the present invention, wherein the sensing module 50 is an exemplary embodiment of the sensing module 10. In this embodiment, the first sensor 100 and the second sensor 102 are photodiodes, for receiving the light signal LS to generate corresponding currents as the first sensing signal MS and the second sensing signal REF. In addition, the first sensor 100 and the second sensor 102 have the same area and are disposed in different locations, such that the crosstalk components CT, $b\times CT$ of the first sensing signal MS and the second sensing signal REF have different intensities. The amplifier circuit 106 is implemented by a current mirror composed of transistors M1 and M2, and the arithmetic circuit 108 is implemented by an analog front-end circuit 500. After receiving the second sensing signal REF at a node N1, the amplifier circuit 106 generates $$\frac{1}{b}$$

of the second sensing signal REF at a node N2. Since the first sensing signal MS and the second sensing signal REF have the same direction at the node N2, the analog front-end circuit 500 may generate the output signal OUT not related to the crosstalk component according to a difference between the first sensing signal MS and $$\frac{1}{b}$$

of the second sensing signal REF. Moreover, since the first sensing signal MS and the second sensing signal REF are currents in this embodiment, the analog front-end circuit 500 may generate the output signal by subtracting the amplified second sensing signal from the first sensing signal, or by subtracting the first sensing signal from the amplified second sensing signal, which have similar results and are within the scope of the present invention.

Figure 6:
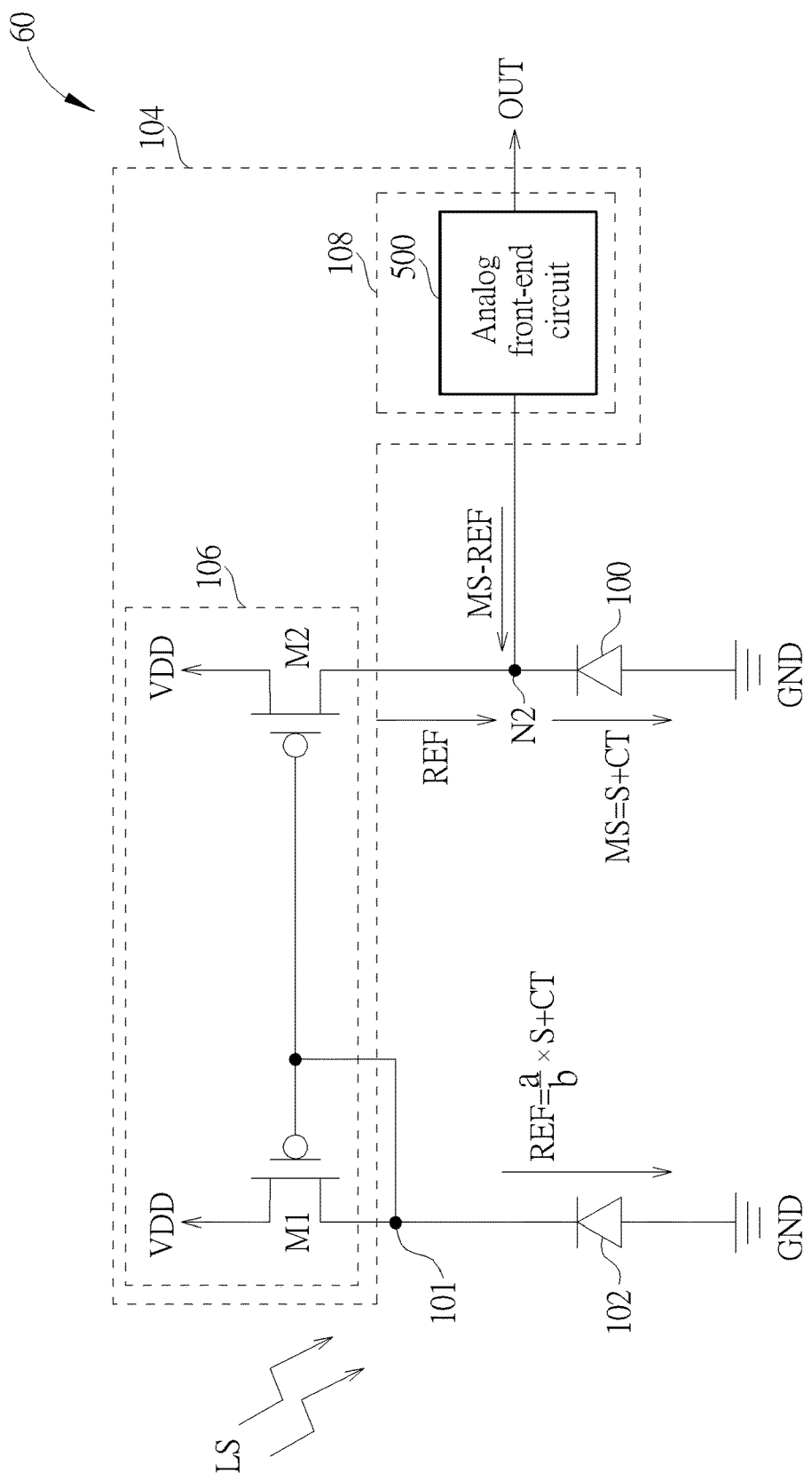
FIG. 6 is a schematic diagram of a sensing module according to an embodiment of the present invention.

Please refer to FIG. 6, which is a schematic diagram of a sensing module 60 according to an embodiment of the present invention, wherein the sensing module 60 is another exemplary embodiment of the sensing module 10. The sensing module 60 shown in FIG. 6 is similar to the sensing module 50 shown in FIG. 5, and thus, elements with similar functions are denoted by the same symbols. In FIG. 6, the light sensitivity (e.g. are) of the second sensor 102 is adjusted (to be different from the light sensitivity of the first sensor 100), to make the first sensing signal MS and the second sensing signal REF to have the crosstalk components CT with the same intensity and the light components S, $$\frac{a}{b}\times S$$

with different intensities. After receiving the second sensing signal REF at the node N1, the amplifier circuit 106 generates the same second sensing signal REF at the node N2. Since the first sensing signal MS and the second sensing signal REF have the same direction at the node N2, the analog front-end circuit 500 may generate the output signal OUT not related to the crosstalk component according to a difference between the first sensing signal MS and the second sensing signal REF.

Figure 7:
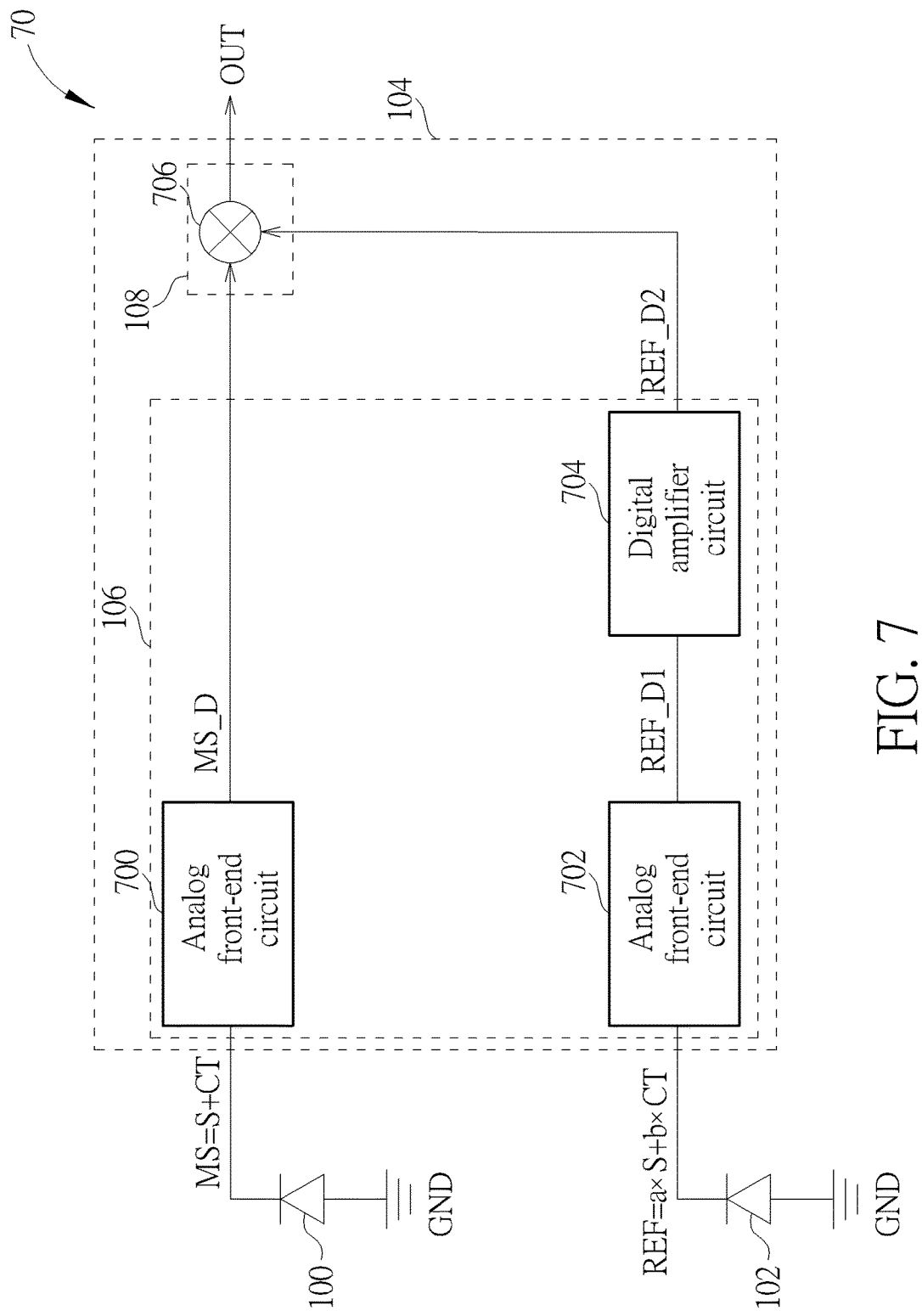
FIG. 7 is a schematic diagram of a sensing module according to an embodiment of the present invention.

Please refer to FIG. 7, which is a schematic diagram of a sensing module 70 according to an embodiment of the present invention, wherein the sensing module 70 is yet another exemplary embodiment of the sensing module 10. In this embodiment, the first sensor 100 and the second sensor 102 are photodiodes, for receiving the light signal LS to generate corresponding currents as the first sensing signal MS and the second sensing signal REF. The amplifier circuit 106 utilizes the analog front-end circuits 700, 702 to convert the first sensing signal MS and the second sensing signal REF into a corresponding first digital signal MS_D and a corresponding second digital signal REF_D1, and utilizes a digital amplifier circuit 704 to multiply the digital reference signal REF_D1 by $$\frac{-1}{b}$$

to generate the digital reference signal REF_D2. In this embodiment, the arithmetic circuit 108 is implemented by a digital adder 706. The digital adder 706 accumulates the first digital signal MS_D and the digital reference signal REF_D2 to generate the output signal OUT not related to the crosstalk component.

To eliminate crosstalk, the prior art usually analyzes light reflected by an object to determine crosstalk degree and perform corresponding compensation, which has low accuracy and high calibration cost. In comparison, the present invention eliminates crosstalk by subtracting sensing results provided by multiple sensors, and has high accuracy and low calibration cost.

In summary, the present invention includes multiple sensors in the sensing module, to simultaneously obtain multiple sensing signals having crosstalk components of different intensities. In such a configuration, the sensing module may appropriately combined multiple sensing signals according to the ratio between the intensities of the crosstalk components in the sensing signals, to generate the output signal that does not include the crosstalk component, such that the back-end circuit may determine accurate sensing results according to the output signal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sensing module, comprising:
   a first sensor, for sensing a light signal to generate a first sensing signal comprising a first crosstalk component related to a crosstalk signal in the light signal;
   a second sensor, for sensing the light signal to generate a second sensing signal comprising a second crosstalk component related to the crosstalk signal; and
   an arithmetic unit, for combining the first sensing signal and the second sensing signal according to a ratio between the first crosstalk component and the second crosstalk component, to generate an output signal;
   wherein a distance between the first sensor and a light source generating the light signal is different from a distance between the second sensor and the light source.

2. The sensing module of claim 1, wherein the output signal is not related to the crosstalk signal.

3. The sensing module of claim 1, wherein the first sensing signal and the second sensing signal are currents, and the arithmetic unit comprises:
   an amplifier circuit, for amplifying the second sensing signal by multiplying the second sensing signal by a negative of the ratio; and
   an arithmetic circuit, for summing the first sensing signal and the amplified second sensing signal up, to compensate the first crosstalk component and the second crosstalk component, and generate the output signal.

4. The sensing module of claim 1, wherein the first sensing signal and the second sensing signal are currents, and the arithmetic unit comprises:
   an amplifier circuit, for amplifying the second sensing signal by multiplying the second sensing signal by the ratio; and
   an arithmetic circuit, for subtracting the amplified second sensing signal from the first sensing signal, to compensate the first crosstalk component and the second crosstalk component, and generate the output signal.

5. The sensing module of claim 4, wherein the first sensor generates the first sensing signal at a first node; the amplifier circuit is a current mirror, for generating the amplified second sensing signal at the first node, and the amplified second sensing signal and the first sensing signal have a same direction; and the arithmetic circuit is an analog front-end circuit, and the analog front-end circuit is coupled to the first node, for generating the output signal according to a difference between the first sensing signal the amplified second sensing signal.

6. The sensing module of claim 4, wherein the amplifier circuit comprises:
   a first analog front-end circuit, for converting the first sensing signal into a first digital signal;
   a second analog front-end circuit, for converting the second sensing signal into a second digital signal; and
   a digital amplifier circuit, for multiplying the first digital signal by a negative reciprocal of the ratio, to generate a digital reference signal;
   wherein the arithmetic circuit is a digital adder, for accumulating the first digital signal and the digital reference signal to generate the output signal.

7. The sensing module of claim 1, wherein light sensitivities of the first sensor and second sensor are different, so that the first crosstalk component and the second crosstalk component have a same intensity.

8. The sensing module of claim 1, wherein the first sensing signal is composed of a first reflection component and the first crosstalk component, the second sensing signal is composed of a second reflection component and the second crosstalk component, and a ratio between the first reflection component and the second reflection component is different from the ratio between the first crosstalk component and the second crosstalk component.

* * * * *